(12) United States Patent
Walunj et al.

(10) Patent No.: US 8,858,160 B2
(45) Date of Patent: Oct. 14, 2014

(54) BUCKET ASSEMBLY FOR TURBINE SYSTEM

(75) Inventors: Jalindar Appa Walunj, Bangalore (IN); Mark Steven Honkomp, Taylors, SC (US)

(73) Assignee: General Electric Company, Schenectady, NY (US)

( * ) Notice: Subject to any disclaimer, the term of this patent is extended or adjusted under 35 U.S.C. 154(b) by 461 days.

(21) Appl. No.: 13/289,090

(22) Filed: Nov. 4, 2011

(65) Prior Publication Data

US 2013/0115100 A1  May 9, 2013

(51) Int. Cl.
*F01D 25/08* (2006.01)
*F01D 5/18* (2006.01)

(52) U.S. Cl.
CPC ............... *F01D 5/187* (2013.01); *F01D 5/186* (2013.01); *F05D 2240/81* (2013.01)
USPC .......................................... 415/115; 416/97 R

(58) Field of Classification Search
USPC ................................ 415/115; 416/96 R, 97 R
See application file for complete search history.

(56) References Cited

U.S. PATENT DOCUMENTS

| | | | |
|---|---|---|---|
| 4,017,213 A | 4/1977 | Przirembel | |
| 5,340,278 A | 8/1994 | Magowan | |
| 5,382,135 A | 1/1995 | Green | |
| 5,639,216 A | 6/1997 | McLaurin et al. | |
| 5,813,835 A | 9/1998 | Corsmeier et al. | |
| 5,848,876 A | 12/1998 | Tomita | |
| 5,915,923 A | 6/1999 | Tomita et al. | |
| 6,017,189 A | 1/2000 | Judet et al. | |
| 6,019,579 A | 2/2000 | Fukuno et al. | |
| 6,065,931 A | 5/2000 | Suenaga et al. | |
| 6,071,075 A | 6/2000 | Tomita et al. | |
| 6,079,946 A | 6/2000 | Suenaga et al. | |
| 6,092,983 A | 7/2000 | Tomita et al. | |
| 6,092,991 A | 7/2000 | Tomita et al. | |
| 6,120,249 A | 9/2000 | Hultgren et al. | |
| 6,132,173 A | 10/2000 | Tomita et al. | |
| 6,190,130 B1 | 2/2001 | Fukue et al. | |
| 6,196,799 B1 | 3/2001 | Fukue et al. | |
| 6,309,175 B1 | 10/2001 | Hahnle et al. | |

(Continued)

FOREIGN PATENT DOCUMENTS

| | | |
|---|---|---|
| DE | 102006004437 A1 | 11/2006 |
| EP | 1122405 A2 | 8/2001 |
| EP | 1514999 A2 | 3/2005 |

OTHER PUBLICATIONS

Co-pending and commonly assigned U.S. Appl. No. 12/852,802, filed Aug. 9, 2010.

(Continued)

*Primary Examiner* — Dwayne J White
(74) *Attorney, Agent, or Firm* — Dority & Manning, P.A.

(57) ABSTRACT

A bucket assembly for a turbine system is disclosed. The bucket assembly includes a main body having an exterior surface and defining a main cooling circuit, and a platform surrounding the main body and at least partially defining a platform cooling circuit. The bucket assembly further includes a passage defined in the main body extending from the exterior surface, the passage connecting the main cooling circuit and the platform cooling circuit, and a plug at least partially disposed in the passage. The plug includes a head and a plunger. The head is configured for preventing a flow through at least a portion of the passage. The plunger has a continuous exterior surface and is configured for allowing a flow between the main cooling circuit and the platform cooling circuit.

20 Claims, 5 Drawing Sheets

(56) References Cited

U.S. PATENT DOCUMENTS

| | | |
|---|---|---|
| 6,390,774 B1 | 5/2002 | Lewis et al. |
| 6,402,471 B1 | 6/2002 | Demers et al. |
| 6,416,284 B1 | 7/2002 | Demers et al. |
| 6,431,833 B2 | 8/2002 | Jones |
| 6,478,540 B2 | 11/2002 | Abuaf et al. |
| 6,481,967 B2 | 11/2002 | Tomita et al. |
| 6,644,920 B2 | 11/2003 | Beeck et al. |
| 6,945,749 B2 | 9/2005 | De Cardenas |
| 7,097,424 B2 | 8/2006 | Cunha et al. |
| 7,131,817 B2 | 11/2006 | Keith et al. |
| 7,144,215 B2 | 12/2006 | Keith et al. |
| 7,147,439 B2 | 12/2006 | Jacala et al. |
| 7,147,440 B2 | 12/2006 | Benjamin et al. |
| 7,198,467 B2 | 4/2007 | Keith et al. |
| 7,255,536 B2 | 8/2007 | Cunha et al. |
| 7,309,212 B2 | 12/2007 | Itzel et al. |
| 7,416,391 B2 | 8/2008 | Veltre et al. |
| 7,513,738 B2 | 4/2009 | Itzel et al. |
| 2004/0094287 A1 | 5/2004 | Wang |
| 2006/0056968 A1 | 3/2006 | Jacala et al. |
| 2006/0269409 A1 | 11/2006 | Torii et al. |
| 2007/0140848 A1 | 6/2007 | Charbonneau et al. |
| 2007/0189896 A1 | 8/2007 | Itzel et al. |

OTHER PUBLICATIONS

Search Report and Written Opinion from EP Application No. 12190998.0 dated May 3, 3012.

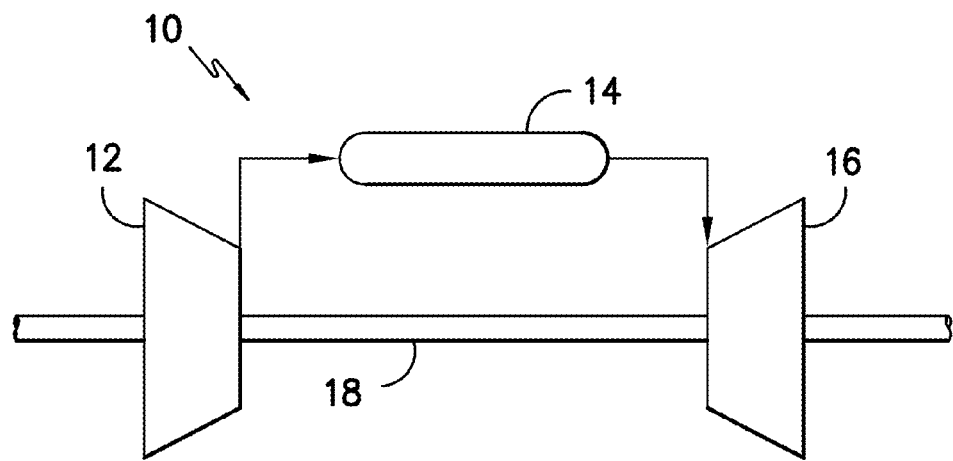
FIG. -1-
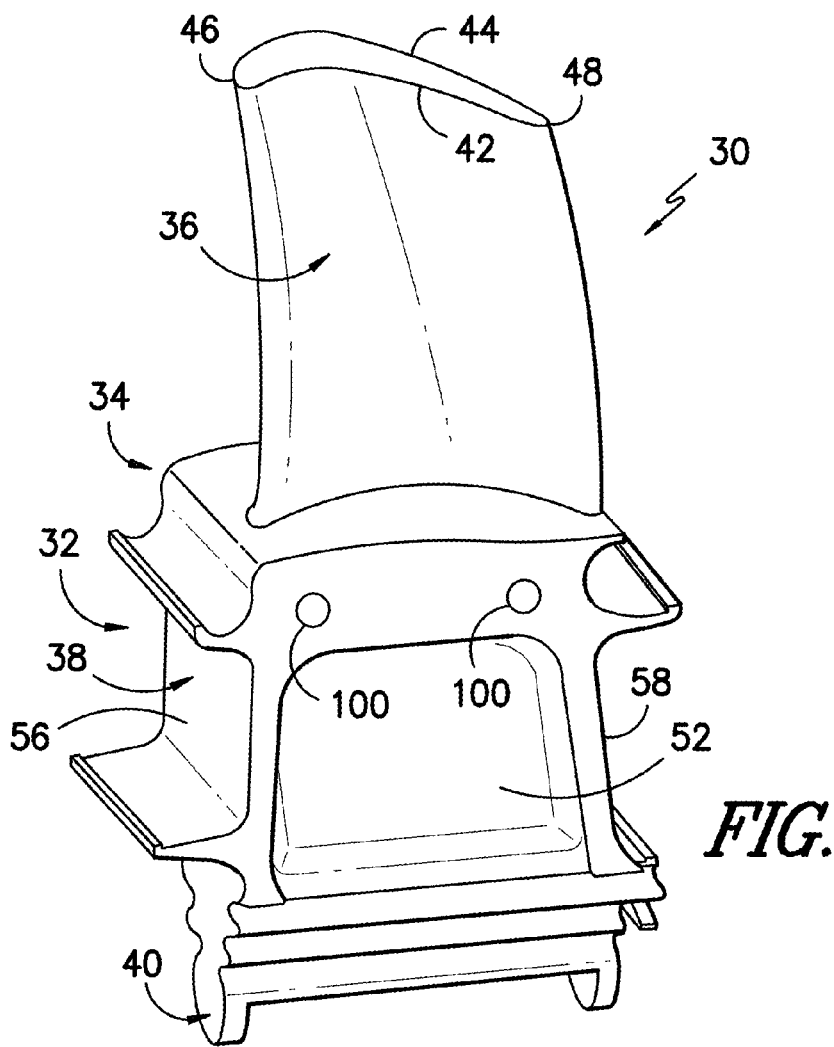
FIG. -2-

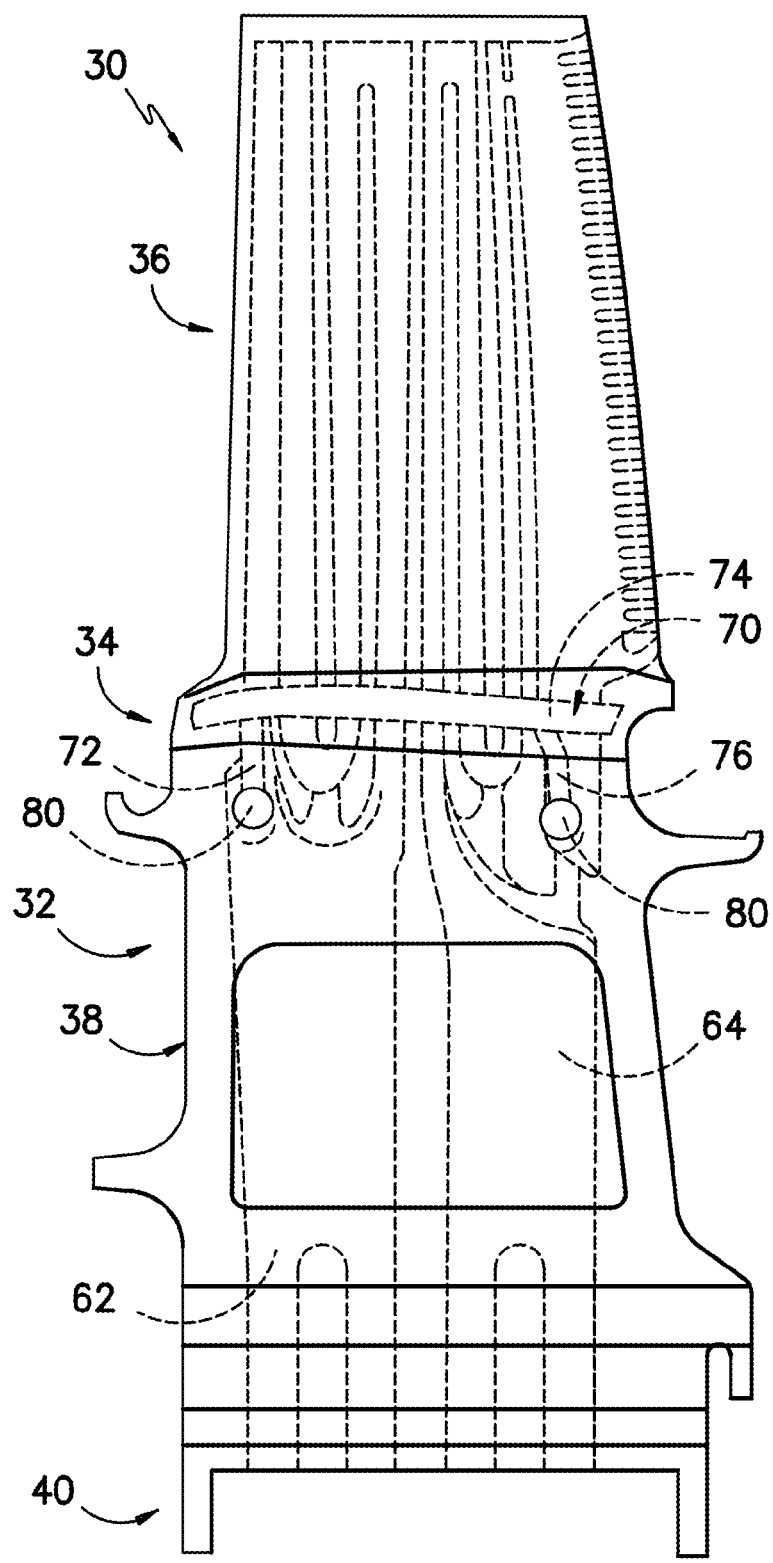
FIG. -3-

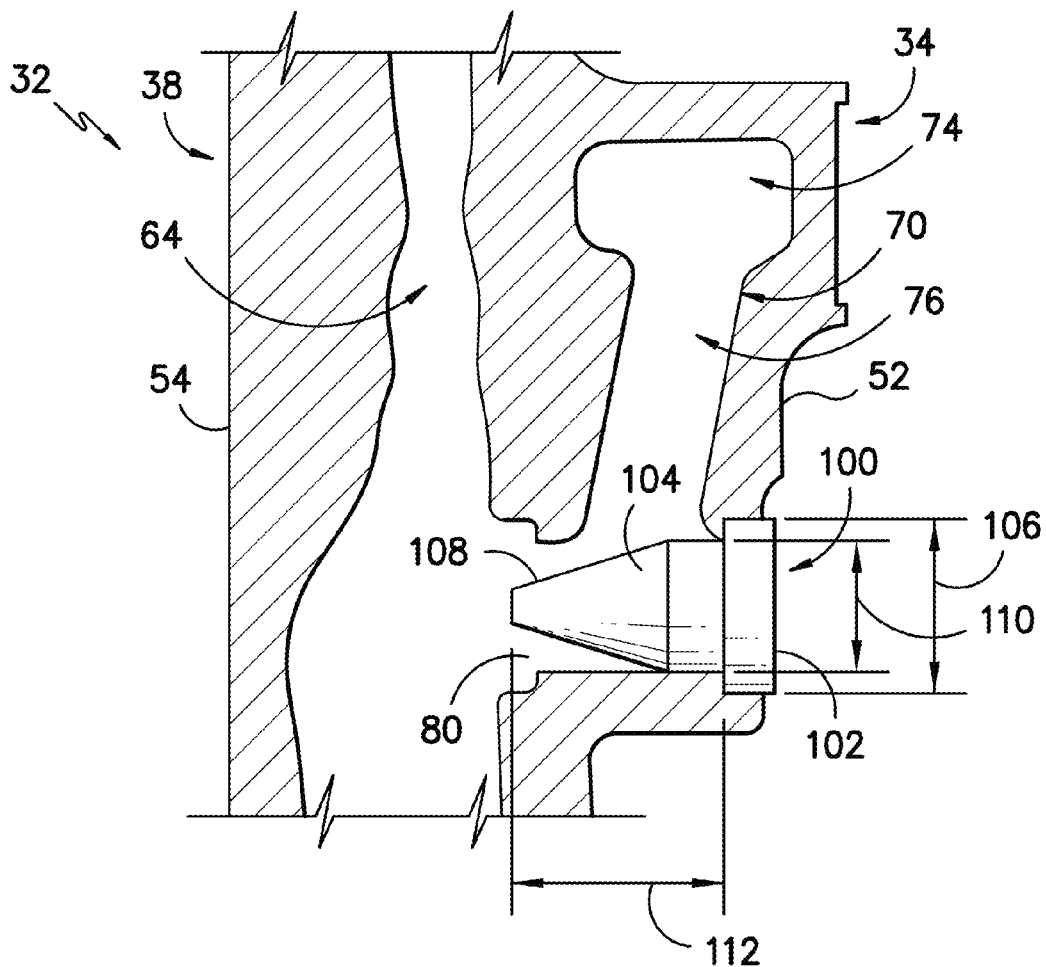
FIG. -4-
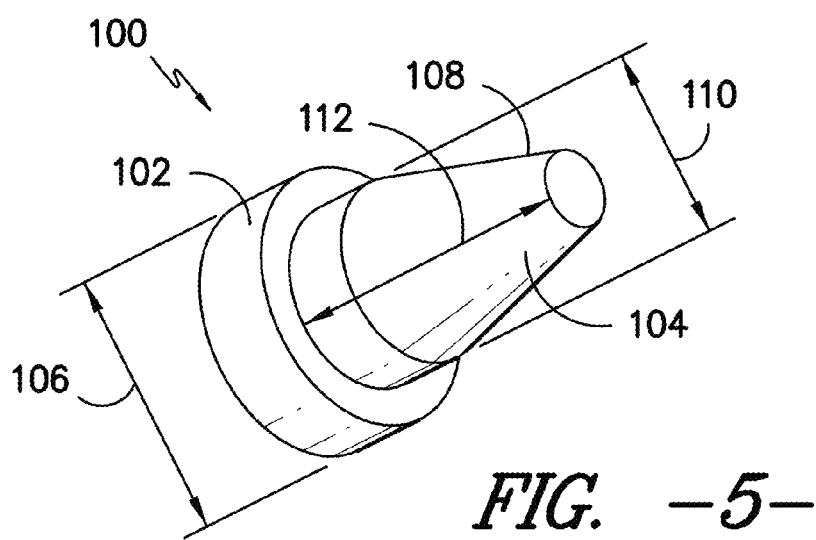
FIG. -5-

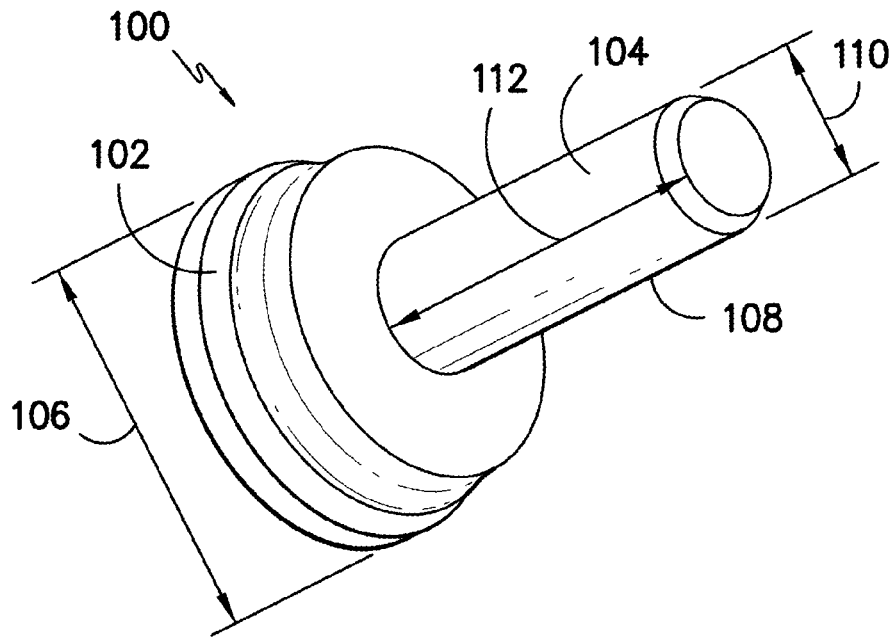
FIG. -6-
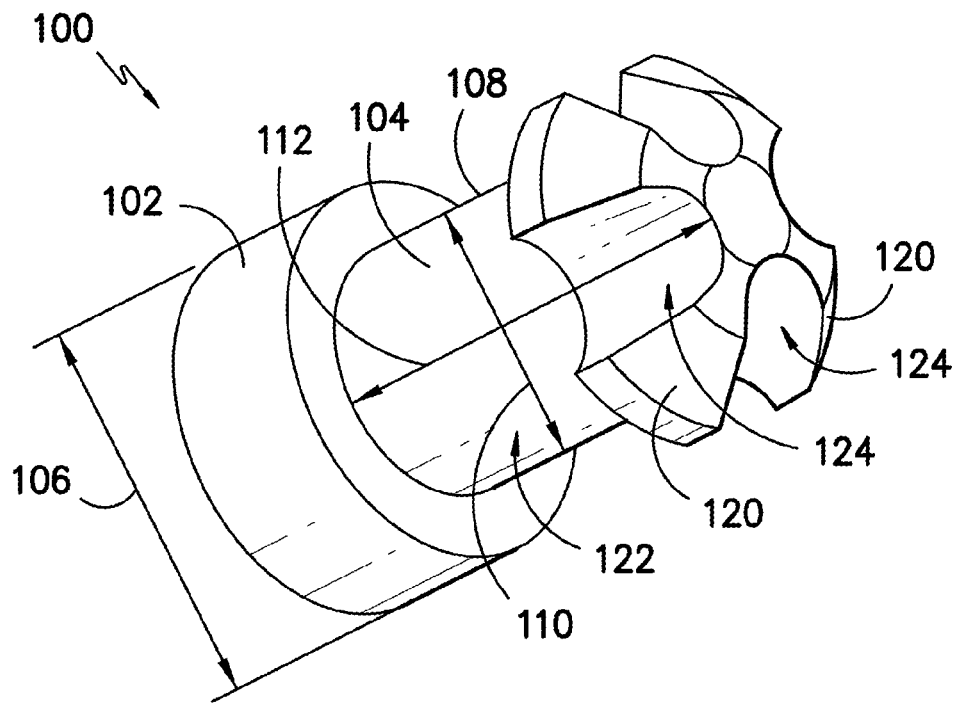
FIG. -7-

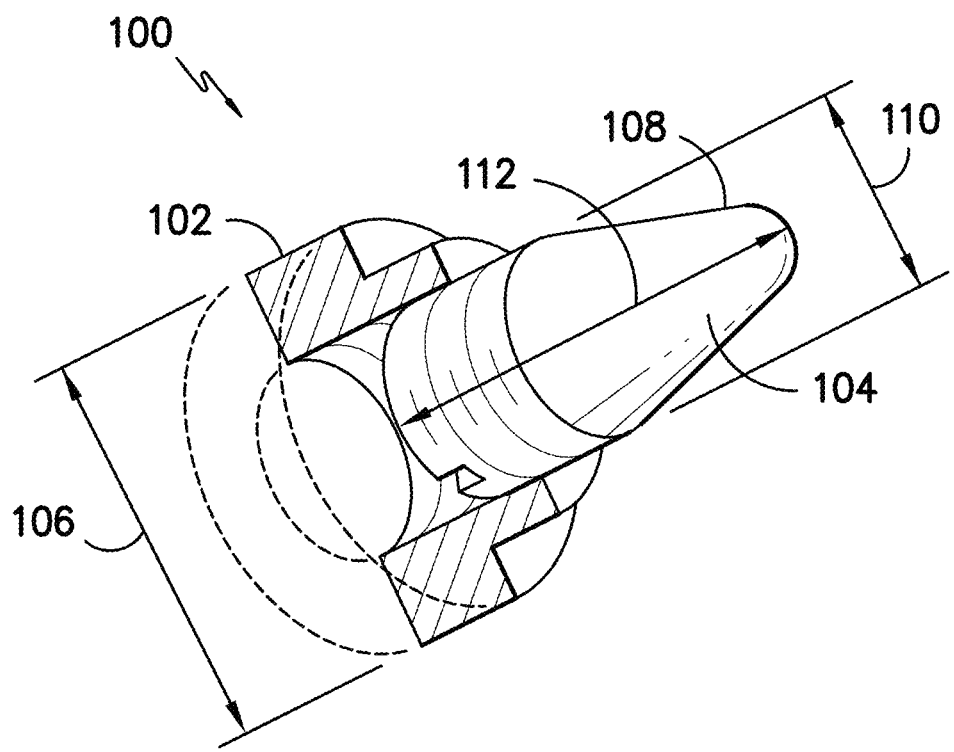
*FIG. −8−*

BUCKET ASSEMBLY FOR TURBINE SYSTEM

FIELD OF THE INVENTION

The subject matter disclosed herein relates generally to turbine systems, and more specifically to bucket assemblies for turbine systems.

BACKGROUND OF THE INVENTION

Turbine systems are widely utilized in fields such as power generation. For example, a conventional gas turbine system includes a compressor, a combustor, and a turbine. During operation of the gas turbine system, various components in the system are subjected to high temperature flows, which can cause the components to fail. Since higher temperature flows generally result in increased performance, efficiency, and power output of the gas turbine system, the components that are subjected to high temperature flows must be cooled to allow the gas turbine system to operate at increased temperatures.

Various strategies are known in the art for cooling various gas turbine system components. For example, a cooling medium may be routed from the compressor and provided to various components. The cooling medium may be utilized to cool various components, such as turbine components.

Buckets are one example of a hot gas path component that must be cooled. For example, various parts of the bucket, such as the airfoil, the platform, the shank, and the dovetail, are disposed in a hot gas path and exposed to relatively high temperatures, and thus require cooling. Various cooling passages and cooling circuits may be defined in the various parts of the bucket, and cooling medium may be flowed through the various cooling passages and cooling circuits to cool the bucket.

In many known buckets, one or more main cooling circuits may be defined in a main body, which typically includes an airfoil and shank. An additional cooling circuit may be defined in the platform. During casting of the bucket, the core components that form these circuits typically remain separate. However, such circuits must generally be in fluid communication in a finished, operable bucket. Thus, after casting, a passage is typically drilled or otherwise formed from the exterior surface of the bucket into the body. The passage extends through and connects the main cooling circuits and platform cooling circuits.

In order to prevent cooling medium from escaping through this passage during operation of the bucket, a plug is typically inserted in the passage. However, known plugs have a variety of disadvantages. For example, many known plugs block any fluid communication between cooling circuits, and include passages within the plug to provide this fluid communication. The use of such passages can cause inefficient cooling by improperly restricting the cooling medium and forcing the cooling medium to follow the paths of such passages. Other known plugs include orientation features, and only operate properly when the plugs are inserted into the passages at proper orientations.

Thus, an improved plug and bucket assembly for a turbine system is desired in the art. Specifically, a plug and bucket system with improved features for providing fluid communication between various cooling circuits would be advantageous.

BRIEF DESCRIPTION OF THE INVENTION

Aspects and advantages of the invention will be set forth in part in the following description, or may be obvious from the description, or may be learned through practice of the invention.

In one embodiment, a bucket assembly for a turbine system is disclosed. The bucket assembly includes a main body having an exterior surface and defining a main cooling circuit, and a platform surrounding the main body and at least partially defining a platform cooling circuit. The bucket assembly further includes a passage defined in the main body extending from the exterior surface, the passage connecting the main cooling circuit and the platform cooling circuit, and a plug at least partially disposed in the passage. The plug includes a head and a plunger. The head is configured for preventing a flow through at least a portion of the passage. The plunger has a continuous exterior surface and is configured for allowing a flow between the main cooling circuit and the platform cooling circuit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a schematic illustration of a gas turbine system according to one embodiment of the present disclosure;

FIG. 2 is a perspective view of a bucket assembly according to one embodiment of the present disclosure;

FIG. 3 is a front view illustrating the internal components of a bucket assembly according to one embodiment of the present disclosure;

FIG. 4 is a cross-sectional view of a bucket assembly according to one embodiment of the present disclosure;

FIG. 5 is a perspective view of a plug according to one embodiment of the present disclosure;

FIG. 6 is a perspective view of a plug according to another embodiment of the present disclosure;

FIG. 7 is a perspective view of a plug according to another embodiment of the present disclosure; and FIG. 8 is a perspective view of a plug according to another embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a schematic diagram of a gas turbine system 10. The system 10 may include a compressor 12, a combustor 14, and a turbine 16. The compressor 12 and turbine 16 may be coupled by a shaft 18. The shaft 18 may be a single shaft or a plurality of shaft segments coupled together to form shaft 18.

The turbine 16 may include a plurality of turbine stages. For example, in one embodiment, the turbine 16 may have three stages. A first stage of the turbine 16 may include a plurality of circumferentially spaced nozzles and buckets. The nozzles may be disposed and fixed circumferentially about the shaft 18. The buckets may be disposed circumferentially about the shaft and coupled to the shaft 18. A second stage of the turbine 16 may include a plurality of circumferentially spaced nozzles and buckets. The nozzles may be disposed and fixed circumferentially about the shaft 18. The buckets may be disposed circumferentially about the shaft 18 and coupled to the shaft 18. A third stage of the turbine 16 may include a plurality of circumferentially spaced nozzles and buckets. The nozzles may be disposed and fixed circumferentially about the shaft 18. The buckets may be disposed circumferentially about the shaft 18 and coupled to the shaft 18. The various stages of the turbine 16 may be at least partially disposed in the turbine 16 in, and may at least partially define, a hot gas path (not shown). It should be understood that the turbine 16 is not limited to three stages, but rather that any number of stages are within the scope and spirit of the present disclosure.

Similarly, the compressor 12 may include a plurality of compressor stages (not shown). Each of the compressor 12 stages may include a plurality of circumferentially spaced nozzles and buckets.

One or more of the buckets in the turbine 16 and/or the compressor 12 may comprise a bucket assembly 30, as shown in FIGS. 2 through 4. The bucket assembly 30 may include a main body 32 and a platform 34. The main body 32 typically includes an airfoil 36 and a shank 38. The airfoil 36 may be positioned radially outward from the shank 38. The shank 38 may include a root 40, which may attach to a rotor wheel (not shown) in the turbine system 10 to facilitate rotation of the bucket assembly 30.

In general, the main body 32 has an exterior surface. In embodiments wherein the main body 32 includes an airfoil 36 and shank 38, for example, the portion of the exterior surface defining the airfoil 36 may have a generally aerodynamic contour. For example, the airfoil 32 may have an exterior surface defining a pressure side 42 and suction side 44 each extending between a leading edge 46 and a trailing edge 48. Further, the portion of the exterior surface of the shank 38 may include a pressure side face 52, a suction side face 54 (see FIG. 4), a leading edge face 56, and a trailing edge face 58.

The platform 34 may generally surround the main body 32, as shown. A typical platform may be positioned at an intersection or transition between the airfoil 36 and shank 38 of the main body 32, and extend outwardly in the generally axial and tangential directions. It should be understood, however, that a platform according to the present disclosure may have any suitable position relative to the main body 32 of the bucket assembly 30.

As shown in FIGS. 3 and 4, the main body 32 may define one or more main cooling circuits therein. The main cooling circuits may extend through portions of the main body 32 to cool the main body 32. For example, in some embodiments as shown, the main body 32 may define a forward main cooling circuit 62 and an aft main cooling circuit 64. The main cooling circuits may have any suitable shape and may extend along any suitable path. For example, as shown each main cooling circuit may have various branches and serpentine portions and may extend through the various portions of the main body 32, such as through the airfoil 36 and shank 38. A cooling medium may be flowed into and through the various main cooling circuits 62, 64 to cool the main body 32.

As further shown in FIGS. 3 and 4, one or more platform cooling circuits 70 may be defined in the bucket assembly 30. In general, the platform cooling circuit 70 may be defined at least partially in the platform 34. For example, in exemplary embodiments, a portion of the platform cooling circuit 70 is defined in the platform 34, and extends through the platform 34 to cool it. Other portions of the platform cooling circuit 70 may extend into the main body 32 to inlet cooling medium into the platform cooling circuit 70 or exhaust the cooling medium therefrom. In one embodiment, as shown in FIGS. 3 and 4, a platform cooling circuit 70 may include an inlet portion 72, an intermediate portion 74, and an outlet portion 76. The inlet portion 72 and outlet portion 76 may be legs extending from the platform 34 into the main body 32, and the intermediate portion 74 may extend through the platform 34. Cooling medium may flow into the platform cooling circuit 70 through the inlet portion 72, flow through intermediate portion 74, and be exhausted through the outlet portion 76.

In many bucket assemblies 30, a platform cooling circuit 70 is in fluid communication with a main cooling circuit, such that cooling medium is flowed from a main cooling circuit into the platform cooling circuit 70 and/or is flowed from a platform cooling circuit 70 to a main cooling circuit. For example, in the embodiment shown in FIGS. 3 and 4, the inlet portion 72 of the platform cooling circuit 70 may be in fluid communication with the forward main cooling circuit 62, while the outlet portion 76 is in fluid communication with the aft main cooling circuit 64.

A bucket assembly 30 according to the present disclosure may further include one or more passages 80. Each passage 80 may be defined in the bucket assembly 30, such as in the main body 32, the platform 34, or at least partially in one or more of the main body 32 and platform 34. Each passage 80 connects a main cooling circuit and a platform cooling circuit 70, and thus provides the fluid communication therebetween. For example, as shown in FIGS. 3 and 4, a passage may connect the inlet portion 72 of a platform cooling circuit 70 to the forward main cooling circuit 62 and/or may connect the outlet portion 76 of a platform cooling circuit 70 to the aft main cooling circuit 64.

Further, a passage 80 according to the present disclosure may extend from the exterior surface of the main body 32, and thus be open to the external environment of the bucket assembly 30. For example, in some embodiments the passage 80 may extend from the exterior surface of the shank 38. As shown, a passage 80 may extend from the pressure side face 52, although in other embodiments a passage 80 may extend from the suction side face 54 or any other suitable face of the shank 38 or other suitable external surface of the main body 32.

During operation of a turbine system 10, a bucket assembly 30 according to the present disclosure may be at risk of cooling medium flowing out of, and hot gases flowing into, the bucket assembly 30 through a passage 80. Thus, the present disclosure is further directed to a plug 100 for a bucket assembly 30, as shown in FIGS. 4 through 8. A plug 100 according to the present disclosure may advantageously reduce or prevent leakage from and into a bucket assembly 30 through a passage 80. Further, a plug 100 according to the present disclosure may allow for efficient flow paths for cooling medium through the various cooling circuits in the bucket assembly 30, and may further require no orientation within a passage 80 for proper operation.

As shown, a plug 100 according to the present disclosure may be at least partially disposed in a passage 80, and may include a head 102 and a plunger 104. The head 102 of a plug 100 may be configured for preventing a flow, such as a flow of cooling medium or a flow of hot gas, through at least a portion of the passage 80. For example, the head 102 may reduce or prevent flow into the passage 80 from exterior to the bucket assembly 30 and/or reduce or prevent flow from the passage 80 to exterior to the bucket assembly 30. Thus, the head 102, or at least a portion thereof, may have a cross-sectional area and/or diameter 106 that is substantially similar or identical to, or larger than, the cross-sectional area of a passage 80 that the plug 100 is at least partially disposed within. The term "diameter" as used herein refers to the maximum diameter of a component with a circular or oval cross-sectional profile, or the maximum width of a component with any other suitable cross-sectional profile. The head 102 may be brazed, welded, mounted with a suitable adhesive, screwed, or otherwise suitably attached to the exterior surface and/or the passage 80.

In some exemplary embodiments as shown in FIGS. 5 through 8, the head 102, or at least a portion thereof, has a circular cross-sectional profile. In other embodiments, the head 102 or any portion thereof may have an oval, rectangular, triangular, or other suitable polygonal cross-sectional profile.

A plunger 104 of a plug 100 according to the present disclosure allows a flow, such as a flow of cooling medium, between a main cooling circuit and a platform cooling circuit 70. As shown, the plunger 104 has an exterior surface 108. The exterior surface 108 is continuous throughout the plunger 104, such that no breaks, apertures, or other breaks or disruptions are defined in the exterior surface 108. The plunger extends through at least a portion of the passage 80, and allows flow around it and between a main cooling circuit and a platform cooling circuit 70 connected by the passage 80.

As shown in FIGS. 5 through 8, in exemplary embodiments, the plunger 104 or at least a portion thereof has a diameter 110 and/or cross-sectional area that is less than a diameter 106 and/or cross-sectional area of the head 102 or at least a portion thereof. The plunger 104 or portion thereof may thus have a diameter and/or cross-sectional area that is less than that of the passage 80, such that cooling medium may flow within the passage 80 around the plunger 104.

In some embodiments, the plunger 104 or a portion thereof may be tapered, as shown in FIGS. 5 and 8. For example, the diameter 110 and/or cross-sectional area of the plunger 104 may taper away from or towards the head 102 through at least a portion of a length 112 of the plunger 104. In other embodiments, the plunger 104 or a portion thereof may have a generally constant diameter 110 and/or cross-sectional area.

As further shown in FIGS. 5 through 8, the plunger 104 in some embodiments has a circular cross-sectional profile. In other embodiments, the plunger 104 or any portion thereof may have an oval, rectangular, triangular, or other suitable polygonal cross-sectional profile.

In some embodiments, as shown in FIG. 7, the plunger 104 may include one or more fins 120. The fins 120 may protrude outwardly from a body 122 of the plunger 104, and may disrupt the flow past the plunger 104. For example, the fins 120 may be angled to swirl the flow, or may be otherwise oriented or positioned to interact with and manipulate the flow. In some embodiments, as shown, fins 120 may be arranged in an annular array. In other embodiments, fins 120 may be aligned in a generally linear fashion, or otherwise suitably positioned.

A plurality of fins 120 may further be spaced part from each other to define a plurality of flutes 124 therebetween, as shown. Cooling medium flowing past the plunger 104 may thus flow past the fins 120 and through the flutes 124, as shown, and be disrupted by the fins 120 and flutes 124.

In some embodiments, as shown in FIG. 8, the plunger 104 may be movable with respect to the head 102. Such movement may allow for metering of the flow around the plunger 104. For example, as shown, the plunger 104 may be threaded to engage mating threads in the head 102. Screwing of the plunger 104 relative to the head 102 may move the plunger 104 with respect to the head 102. In other embodiments, the plug 100 may include a spring or other suitable adjustable component that allows movement of the plunger 104 with respect to the head 102.

As discussed, a plug 100 according to the present disclosure may advantageously reduce or prevent leakage from and into a bucket assembly 30 through a passage 80. Further, a plug 100 according to the present disclosure may allow for efficient flow paths for cooling medium through the various cooling circuits in the bucket assembly 30, and may further require no orientation within a passage 80 for proper operation. Such plugs 100 may additionally disrupt the flow past the plugs 100, providing better cooling characteristics to the flow, and/or may have movable feature that allow for tailored metering of the flows.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A bucket assembly for a turbine system, comprising:
   a main body having an exterior surface and defining a main cooling circuit;
   a platform surrounding the main body and at least partially defining a platform cooling circuit,
   a passage defined in the main body extending from the exterior surface, the passage connecting the main cooling circuit and the platform cooling circuit; and
   a plug at least partially disposed in the passage, the plug comprising a head and a plunger, the head configured for preventing a flow through at least a portion of the passage, the plunger having a continuous exterior surface and configured for allowing a flow between the main cooling circuit and the platform cooling circuit, wherein the plunger has a diameter that is less than a diameter of the head.

2. The bucket assembly of claim 1, wherein the platform cooling circuit comprises an inlet portion, an intermediate portion, and an outlet portion, and wherein the passage connects the main cooling circuit and the outlet portion.

3. The bucket assembly of claim 1, wherein the plunger has a length and a diameter, and wherein the diameter of the plunger tapers away from the head through at least a portion of the length.

4. The bucket assembly of claim 1, wherein the plunger comprises a plurality of fins arranged in an annular array, the plurality of fins spaced apart from each other to define a plurality of flutes therebetween.

5. The bucket assembly of claim 1, wherein the head has a circular cross-sectional profile.

6. The bucket assembly of claim 1, wherein the plunger has a circular cross-sectional profile.

7. The bucket assembly of claim 1, wherein the plunger is movable with respect to the head.

8. The bucket assembly of claim 1, wherein the main body defines a plurality of main cooling circuits.

9. The bucket assembly of claim 1, wherein the main body comprises an airfoil and a shank, the airfoil positioned radially outward from the shank.

10. A turbine system, comprising:
a compressor;
a turbine coupled to the compressor; and
a plurality of bucket assemblies disposed in at least one of the compressor or the turbine, at least one of the bucket assemblies comprising:
a main body having an exterior surface and defining a main cooling circuit;
a platform surrounding the main body and at least partially defining a platform cooling circuit,
a passage defined in the main body extending from the exterior surface, the passage connecting the main cooling circuit and the platform cooling circuit; and
a plug at least partially disposed in the passage, the plug comprising a head and a plunger, the head configured for preventing a flow through at least a portion of the passage, the plunger having a continuous exterior surface and configured for allowing a flow between the main cooling circuit and the platform cooling circuit, wherein the plunger has a diameter that is less than a diameter of the head.

11. The turbine system of claim 10, wherein the platform cooling circuit comprises an inlet portion, an intermediate portion, and an outlet portion, and wherein the passage connects the main cooling circuit and the outlet portion.

12. The turbine system of claim 10, wherein the plunger has a length and a diameter, and wherein the diameter of the plunger tapers away from the head through at least a portion of the length.

13. The turbine system of claim 10, wherein the plunger comprises a plurality of fins arranged in an annular array, the plurality of fins spaced apart from each other to define a plurality of flutes therebetween.

14. The turbine system of claim 10, wherein the head has a circular cross-sectional profile.

15. The turbine system of claim 10, wherein the plunger has a circular cross-sectional profile.

16. The turbine system of claim 10, wherein the plunger is movable with respect to the head.

17. The turbine system of claim 10, wherein the main body defines a plurality of main cooling circuits.

18. The turbine system of claim 10, wherein the main body comprises an airfoil and a shank, the airfoil positioned radially outward from the shank.

19. A bucket assembly for a turbine system, comprising:
a main body having an exterior surface and defining a main cooling circuit;
a platform surrounding the main body and at least partially defining a platform cooling circuit,
a passage defined in the main body extending from the exterior surface, the passage connecting the main cooling circuit and the platform cooling circuit; and
a plug at least partially disposed in the passage, the plug comprising a head and a plunger, the head configured for preventing a flow through at least a portion of the passage, the plunger having a continuous exterior surface and configured for allowing a flow around the continuous exterior surface between the main cooling circuit and the platform cooling circuit.

20. The bucket assembly of claim 19, wherein the plunger has a diameter that is less than a diameter of the head.

* * * * *